No. 642,100. Patented Jan. 30, 1900.
R. FEDERROLL.
ACETYLENE GAS GENERATOR.
(Application filed Nov. 29, 1899.)
(No Model.)
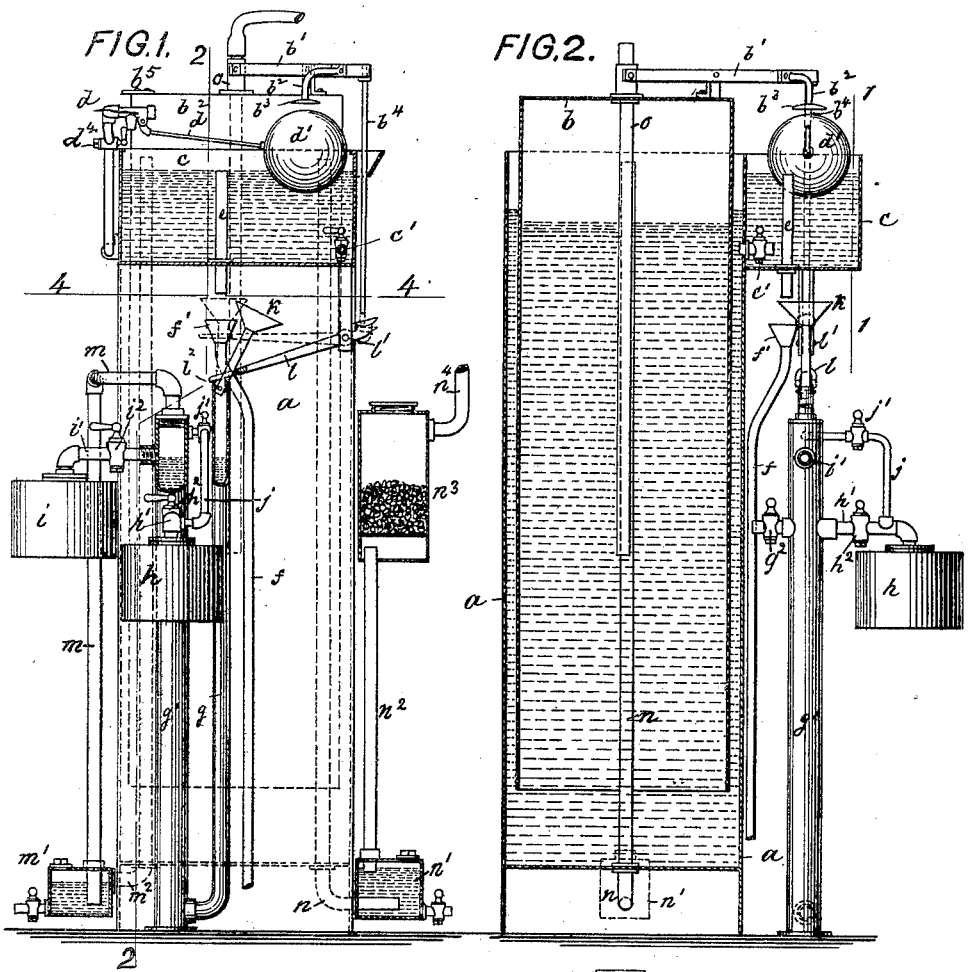
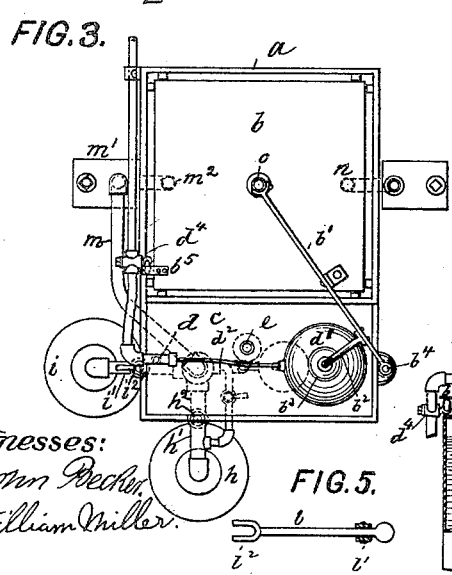
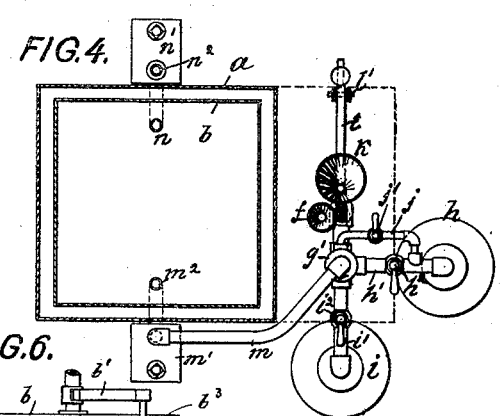
Witnesses:
John Becker
William Miller
Inventor:
Rudolph Federroll
by his attorneys
Roeder & Briese

UNITED STATES PATENT OFFICE.

RUDOLPH FEDERROLL, OF NEW YORK, N. Y.

ACETYLENE-GAS GENERATOR.

SPECIFICATION forming part of Letters Patent No. 642,100, dated January 30, 1900.

Application filed November 29, 1899. Serial No. 738,640. (No model.)

*To all whom it may concern:*

Be it known that I, RUDOLPH FEDERROLL, of New York city, county and State of New York, have invented new and useful Improvements in Acetylene-Gas Generators, of which the following is a specification.

This invention relates to an acetylene-gas generator of novel construction in which the descent of the bell of a gas-meter causes the water to be turned on and the water in a water-reservoir to overflow into the carbid-pots, while the supply of water will be cut off after the float has risen and the proper water-level has been reëstablished. Thus the generation of the gas is properly regulated and an undue production of gas prevented.

The invention consists in the various features of construction fully pointed out in the claims.

In the accompanying drawings, Figure 1 is a longitudinal section of my improved acetylene-gas generator on line 1 1, Fig. 2. Fig. 2 is a longitudinal section at right angles to Fig. 1 on line 2 2, Fig. 1. Fig. 3 is a plan of the generator; Fig. 4, a horizontal section on line 4 4, Fig. 1; Fig. 5, a detail of fork 1, and Fig. 6 a longitudinal section of a modification of the water-reservoir.

The letter $a$ represents the lower tank of a gas-holder, adapted to be filled with water, and $b$ is the vertically-movable bell dipping into the same, as usual. To one side of the tank $a$ is affixed, near its upper end, a reservoir $c$, to which water may be admitted from the water-service pipe by a cock $d$, to which a ball, float, or displacer $d'$ is connected by arm $d^2$. From the reservoir $c$ water may be supplied to tank $a$ by cock $c'$. From the top of the bell $b$ projects laterally an arm $b'$, provided with a branch $b^2$, that carries a small plate $b^3$. This plate is adapted to bear bodily upon the float $d'$ when the bell descends, and to thus force the ball downward to displace the water in the reservoir and simultaneously open the cock $d$. Into the reservoir $c$ projects an overflow-pipe $e$, Fig. 1, open at its lower end and placed vertically above the flaring mouth or funnel $f'$ of a waste-pipe $f$, Fig. 2. Below the pipe $e$ is, furthermore, placed a water-conduit pipe $g$, that is adapted to convey the water during the normal operation of the apparatus to a stand-pipe $g'$, to which two or more pots $h$ $i$, containing the carbid of calcium, are connected at different elevations by branch pipes $h'$ $i'$. A draw-off cock $g^2$ permits the water to be discharged from the upper end of stand-pipe $g'$ above level of branch $h'$, Fig. 2, while cocks $h^2$ $i^2$ in branches $h'$ $i'$ control the admission of water to the lower and upper pots, respectively. An additional pipe $j$, having cock $j'$, connects stand-pipe $g'$ above level of branch $i'$ to branch $h'$ in front of cock $h^2$, Fig. 2.

Water is adapted to be admitted from pipe $e$ into pipe $g$ by a funnel $k$, pivoted to the upper end of pipe $g$ and engaged by the forked end $l^2$ of a lever $l$, Fig. 5, pivoted at $l'$ and actuated by a rod $b^4$, depending from arm $b'$. When the bell $b$ descends, the fork $l^2$ will be swung up to righten funnel $k$ and bring it directly beneath pipe $e$ above funnel $f'$. Thus the water which has simultaneously been displaced by the depressed float $d'$ and overflown into pipe $e$ will be conveyed to the carbid-pots to generate gas. When the bell $b$ ascends, the fork $l^2$ will drop, and the funnel $k$, being now unsupported, will tilt, Fig. 1, to no longer intercept the water, so that any overflow will be drained off through funnel $f'$ and pipe $f$.

The gas generated in the carbid-pots flows into the upper end of pipe $g'$, and thence through pipe $m$, gas-washer $m'$, and pipe $m^2$ into the bell $b$. From the bell the gas flows through pipe $n$, gas-washer $n'$, pipe $n^2$, and gas-drier $n^3$ to the service-pipe $n^4$. Should the bell $b$ be raised to an excessive height, the lower open end of a blow-off pipe $o$, secured to the bell, will be uncovered from the water, and the gas may thus escape.

The operation is as follows: Upon the descent of the bell the plate $b^3$ will bear upon the float $d'$ and force it bodily into the water contained within the reservoir $c$ to open cock $d$ and to simultaneously displace the water. Should the bell descend too far, a projection $b^5$ on the bell will bear upon the handle of a cock $d^4$ to shut off the water-supply. The water displaced by float $d'$ will overflow pipe $e$ and pass through pipes $g$ $g'$ to the carbid-pots to generate the gas. The gas will, through pipe $m^2$, enter the bell $b$ to raise the same, and thus release float $d'$ from the pressure of plate $b^3$. Thus the float will rise and close cock $d$ after the normal level of water in reservoir $c$ has been reëstablished. In this way the production of the gas is in exact proportion to its consumption, and an accurate and reliable operation of the generator is obtained. The float $d'$ performs, as will be seen, a double function, in that it acts, first, as the opening and closing means of the cock $d$, and, secondly, as a displacer, by the descent of which the level of the water is raised above the mouth of pipe $e$, so as to overflow into the carbid-pots.

The action of the carbid-pots is as follows: The water first reaches the lowermost pot $h$, and as long as gas is generated therein the water will not rise to pot $i$. When the carbid in pot $h$ has been exhausted, the water will pass to pot $i$, and during the generation of gas in this pot the pot $h$ is removed and recharged, the cocks $j'$ $h^2$ being first closed. After the pot $i$ is exhausted the drain-cock $g^2$ is opened to discharge water from upper end of pipe $g'$, and the pot $h$ is again connected to pipe $g'$. Should it be neglected to make the proper connections from pot $i$ to pot $h$ at the proper time, the water will rise in pipe $g'$ above the level of pipe $i'$, and thus flow through the "emergency-pipe" $j$ to the pot $h$, the pot $j'$ being opened immediately upon the coupling of pot $h$, so that the generation of gas proceeds without interruption.

In Fig. 6 an overflow-pipe $p$ projects into the reservoir $c$ to a higher level than the pipe $e$. In this case the pipe $e$ leads directly to the carbid-pots, and the arrangement of the tilting funnel is dispensed with. If the ball-float is depressed, the displaced water will overflow into pipe $e$ to generate the gas in manner already described. If, however, the water rises within the reservoir to an abnormal level, it will be drained off by overflow $p$.

What I claim is—

1. In an acetylene-gas generator, the combination of a tank and bell, with a water-reservoir, an overflow-pipe entering the same, a carbid-pot adapted to communicate therewith, a water-cock, a float within the water-reservoir connected to the cock, and means on the bell for depressing the float upon the descent of the bell, to displace the water and simultaneously open the cock, substantially as specified.

2. In an acetylene-gas generator, the combination of a tank and bell, with a water-reservoir, an overflow-pipe, a water-pipe communicating therewith, a number of carbid-pots communicating with the water-pipe at different levels, a pipe $j$, that connects the water-pipe, above the level of the uppermost pot to the lowermost pot, and pipes that are adapted to convey the generated gas respectively into and out of the bell, substantially as specified.

3. In an acetylene-gas generator, the combination of a tank and bell, with a water-reservoir, an overflow-pipe entering the same, a water-pipe, a carbid-pot connected thereto, a funnel pivoted to the water-pipe, a ball-cock communicating with the water-reservoir, and means on the bell for depressing the ball of the ball-cock and simultaneously tilting the funnel upon the descent of the bell, substantially as specified.

RUDOLPH FEDERROLL.

Witnesses:
WILLIAM SCHULZ,
F. V. BRIESEN.